US011922932B2

(12) United States Patent
Prabhavalkar et al.

(10) Patent No.: US 11,922,932 B2
(45) Date of Patent: Mar. 5, 2024

(54) MINIMUM WORD ERROR RATE TRAINING FOR ATTENTION-BASED SEQUENCE-TO-SEQUENCE MODELS

(71) Applicant: Google LLC, Mountain View, CA (US)

(72) Inventors: Rohit Prakash Prabhavalkar, Palo Alto, CA (US); Tara N. Sainath, Jersey City, NJ (US); Yonghui Wu, Fremont, CA (US); Patrick An Phu Nguyen, Mountain View, CA (US); Zhifeng Chen, Sunnyvale, CA (US); Chung-Cheng Chiu, Sunnyvale, CA (US); Anjuli Patricia Kannan, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/194,586

(22) Filed: Mar. 31, 2023

(65) Prior Publication Data

US 2023/0237995 A1 Jul. 27, 2023

Related U.S. Application Data

(63) Continuation of application No. 17/443,557, filed on Jul. 27, 2021, now Pat. No. 11,646,019, which is a (Continued)

(51) Int. Cl.
*G10L 15/197* (2013.01)
*G10L 15/02* (2006.01)
(Continued)

(52) U.S. Cl.
CPC ............ *G10L 15/197* (2013.01); *G10L 15/02* (2013.01); *G10L 15/063* (2013.01); *G10L 15/16* (2013.01);
(Continued)

(58) Field of Classification Search
CPC ..... G10L 15/197; G10L 15/02; G10L 15/063; G10L 15/16; G10L 15/22; G10L 2015/025
See application file for complete search history.

(56) References Cited

U.S. PATENT DOCUMENTS 7,454,326 B2 * 11/2008 Marcu .................... G06F 40/44
704/277
2017/0011738 A1 * 1/2017 Senior ................... G10L 15/063
(Continued)

OTHER PUBLICATIONS

Graves, A. & Jaitly, N. (2014). Towards End-To-End Speech Recognition with Recurrent Neural Networks. Proceedings of the 31st International Conference on Machine Learning, in PMLR 32(2):1764-1772 (Year: 2014).*
(Continued)

*Primary Examiner* — Daniel C Washburn
*Assistant Examiner* — Athar N Pasha
(74) *Attorney, Agent, or Firm* — Honigman LLP; Brett A. Krueger; Grant J. Griffith

(57) ABSTRACT

Methods, systems, and apparatus, including computer programs encoded on computer-readable storage media, for speech recognition using attention-based sequence-to-sequence models. In some implementations, audio data indicating acoustic characteristics of an utterance is received. A sequence of feature vectors indicative of the acoustic characteristics of the utterance is generated. The sequence of feature vectors is processed using a speech recognition model that has been trained using a loss function that uses a set of speech recognition hypothesis samples, the speech recognition model including an encoder, an attention module, and a decoder. The encoder and decoder each include one or more recurrent neural network layers. A sequence of output vectors representing distributions over a predetermined set of linguistic units is obtained. A transcription for
(Continued)

the utterance is obtained based on the sequence of output vectors. Data indicating the transcription of the utterance is provided.

20 Claims, 6 Drawing Sheets

Related U.S. Application Data continuation of application No. 16/529,252, filed on Aug. 1, 2019, now Pat. No. 11,107,463.

(60) Provisional application No. 62/713,332, filed on Aug. 1, 2018.

(51) Int. Cl.
  *G10L 15/06* (2013.01)
  *G10L 15/16* (2006.01)
  *G10L 15/22* (2006.01)

(52) U.S. Cl.
  CPC ........ *G10L 15/22* (2013.01); *G10L 2015/025* (2013.01)

(56) References Cited

U.S. PATENT DOCUMENTS

| | | | |
|---|---|---|---|
| 2017/0148431 A1 | 5/2017 | Catanzaro et al. | |
| 2017/0221474 A1* | 8/2017 | Hori | G10L 15/08 |
| 2018/0261225 A1 | 9/2018 | Watanabe et al. | |
| 2018/0330718 A1 | 11/2018 | Hori et al. | |
| 2019/0057683 A1 | 2/2019 | Sak et al. | |
| 2019/0213999 A1* | 7/2019 | Grupen | G10L 15/22 |
| 2019/0318725 A1* | 10/2019 | Le Roux | G10L 15/16 |

OTHER PUBLICATIONS

Hayashi, T. et al. "Multi-Head Decoder for End-to-End Speech Recognition." ArXiv abs/1804.08050 (2018): n. pag. (Year: 2018).
Abadi et al., "Tensorflow: Large-scale machine learning on heterogeneous distributed systems," arXiv, Mar. 2016, 19 pages.
Bahdanau et al., "An actor-critic algorithm for structured prediction," arXiv, Jul. 2016, 12 pages.
Bahdanau et al., "End-to-end attention-based large vocabulary speech recognition," 2016 IEEE international conference on acoustics, speech and signal processing (ICASSP), Mar. 2016, 8 pages.
Bahdanau et al., "Neural machine translation by jointly learning to align and translate," arXiv, May 2016, 15 pages.
Bengio et al., "Scheduled sampling for sequence prediction with recurrent neural networks," Advances in Neural Information Processing Systems, Jun. 2015, 9 pages.
Chan et al., "Listen, attend and spell: A neural network for large vocabulary conversational speech recognition," 2016 IEEE International Conference on Acoustics, Speech and Signal Processing (ICASSP) Mar. 2016, 16 pages.
Graves et al., "Connectionist temporal classification: Labelling unsegmented sequence data with recurrent neural networks," Proceedings of the 23rd international conference on Machine learning, Jun. 2006, 8 pages.
Graves et al., "Towards end-to-end speech recognition with recurrent neural networks," International conference on machine learning, Jan. 2014, 9 pages.
Graves et al., "Speech recognition with deep neural networks," arXiv, May 2013, 5 pages.
Hochreiter et al., "Long short-term memory," Neural computation, Nov. 1997, 32 pages.
USPTO. Office Action relating to U.S. Appl. No. 17/443,557, dated Sep. 14, 2022.
Matt Shannon, "Optimizing expected word error rate via sampling for speech recognition", arXiv, dated Jun. 8, 2017.

* cited by examiner

MINIMUM WORD ERROR RATE TRAINING FOR ATTENTION-BASED SEQUENCE-TO-SEQUENCE MODELS

CROSS-REFERENCE TO RELATED APPLICATIONS

This U.S. patent application is a continuation of, and claims priority under 35 U.S.C. § 120 from, U.S. patent application Ser. No. 17/443,557, filed on Jul. 27, 2021, which is a continuation of U.S. patent application Ser. No. 16/529,252, filed on Aug. 1, 2019, which claims priority under 35 U.S.C. § 119(e) to U.S. Provisional Patent Application No. 62/713,332, filed on Aug. 1, 2018. The disclosures of these prior applications are considered part of the disclosure of this application and are hereby incorporated by reference in their entireties.

BACKGROUND

The present specification relates to automatic speech recognition (ASR).

SUMMARY

In some implementations, speech recognition can be performed using attention-based sequence-to-sequence models optimized to directly minimize WER. The techniques used to generate and train the models can approximate the expected WER using hypotheses from the model. Sampling-based approaches and the approximation of the loss over N-best lists of recognition hypotheses may be used. The process is more effective by approximating the expected WER using N-best hypotheses decoded from the model using beam-search rather than sampling from the model. As an example, the techniques can be applied to an English mobile voice-search task, to optimize grapheme-based models, with uni- and bi-directional encoders, where it is found that WER can be improved by up to 8.2% relative to a cross-entropy (CE)-trained baseline model. Minimum word error rate training allows training on grapheme-based sequence-to-sequence models, which are comparable in performance to a strong state-of-the-art context-dependent (CD) phoneme-based speech recognition system.

Sequence-to-sequence models, such as attention-based models in ASR, are often trained to optimize the cross-entropy criterion which corresponds to improving the log-likelihood of the data. However, system performance is usually measured in terms of word error rate (WER), not log-likelihood. Some ASR systems benefit from discriminative sequence training which optimizes criteria such as the state-level minimum Bayes risk (sMBR) which are more closely related to WER. The techniques discussed herein can be used to train attention-based models to directly minimize expected word error rate. Two loss functions may be used to approximate the expected number of word errors: either by sampling from the model, or by using N-best lists of decoded hypotheses. As noted above, the proposed training procedure improves performance of the ASR models by up to 8.2% relative to the baseline system. This demonstrates improved accuracy of the models, as shown by reduced word errors in recognition. This allows us to train grapheme-based, uni-directional attention-based models which match the performance of much more complex and computationally intensive state-of-the-art, discriminative sequence-trained systems for transcribing utterances such as voice queries.

There has been growing interest in the ASR community in building end-to-end trained, sequence-to-sequence models which directly output a word sequence given input speech frames. Examples of such approaches include the recurrent neural network transducer (RNN-T), the recurrent neural aligner (RNA), attention-based models, and connectionist temporal classification (CTC) with word-based targets. Such approaches are motivated by their simplicity: since these models directly output graphemes, word-pieces, or words, they do not require expertly curated pronunciation dictionaries. Since they can be trained to directly output normalized text, they do not require separate modules to map recognized text from the spoken to the written domain.

Most sequence-to-sequence models are typically trained to optimize the cross-entropy (CE) loss function, which corresponds to improving log-likelihood of the training data. During inference, however, model performance is commonly measured using task-specific criteria, not log-likelihood: e.g., word error rate (WER) for ASR, or BLEU score for machine translation. Traditional ASR systems account for this mismatch through discriminative sequence training of neural network acoustic models (AMs), which fine-tunes a cross-entropy trained AM with criteria such as state-level minimum Bayes risk (sMBR), which are more closely related to word error rate. However, this process requires the training of multiple models, e.g., acoustic model, language model (LM), and potentially pronunciation models (PMs), and increases the size, complexity, and computational demands of the model. The techniques discussed herein for an end-to-end model trained directly using WER criteria can provide performance at least as accurate as more computationally demanding systems with separate AM, LM, and PM. The techniques also provide end-to-end models that provide increased accuracy relative to previous end-to-end models.

In some implementations, a method performed by one or more computers of a speech recognition system includes: receiving, by the one or more computers, audio data indicating acoustic characteristics of an utterance; generating, by the one or more computers, a sequence of feature vectors indicative of the acoustic characteristics of the utterance; processing, by the one or more computers, the sequence of feature vectors using a speech recognition model that has been trained using a loss function that uses N-best lists of decoded hypotheses, the speech recognition model comprising an encoder, an attention module, and a decoder, wherein the encoder and decoder each comprise one or more recurrent neural network layers; obtaining, by the one or more computers as a result of the processing with the speech recognition model, a sequence of output vectors representing distributions over a predetermined set of linguistic units; determining, by the one or more computers, a transcription for the utterance based on the sequence of output vectors; and providing, by the one or more computers, data indicating the transcription of the utterance.

Implementations can include one or more of the following features. For example, the speech recognition model has been trained such that the loss function distributes probability weight over items in the N-best lists.

In some implementations, the speech recognition model has been trained to directly minimize expected word error rate.

In some implementations, the speech recognition model is configured to output a probability distribution over a predetermined set of grapheme symbols.

In some implementations, the attention module provides multi-headed attention in which multiple different sets of weighting parameters are used to process different segments of output from the encoder.

In some implementations, the attention module comprises a plurality of neural networks that are separately trained to generate output to the decoder from different segments of output from the encoder.

In some implementations, the attention module comprises at least four attention heads.

In some implementations, the one or more recurrent neural network layers comprise long short-term memory (LSTM) cells.

In some implementations, the encoder and decoder each include a plurality of unidirectional LSTM layers.

In some implementations, the encoder comprises a plurality of bidirectional LSTM layers.

In some implementations, the speech recognition model has been trained by performing, for each training example of multiple training examples, operations including: determining a plurality of speech recognition hypotheses using the speech recognition model being trained; ranking the plurality of speech recognition hypotheses; identifying N highest-ranking speech recognition hypotheses in the plurality of speech recognition hypotheses, where N is an integer of a predetermined value; distributing probability mass concentrated entirely on the N highest-ranking speech recognition hypotheses; and approximating a loss function for training according to the distributed probability mass.

In some implementations, distributing the probability mass is performed based on the respective number of word errors identified for the N highest-ranking speech recognition hypotheses.

In some implementations, determining the plurality of speech recognition hypotheses comprises using beam search to determine the plurality of speech recognition hypotheses. For training for each of the multiple training examples, the speech recognition model is trained using a same predetermined beam size and a same predetermined value of N. Distributing the probability mass comprises normalizing, for each training example, the entire probability mass over the N highest-ranking speech recognition hypotheses for the training example.

In some implementations, the operations include reducing variance by adjusting for an average number of word errors over the N highest-ranking speech recognition hypotheses for a training example.

In some implementations, the speech recognition model is configured to provide streaming speech recognition results that include substantially real-time transcriptions of a portion of an utterance while a speaker of the utterance continues to speak the utterance.

In some implementations, the speech recognition model is an end-to-end neural network model.

In some implementations, the speech recognition model has been trained using N-best lists determined using beam search.

In some implementations, the attention module provides multi-headed attention in which multiple different sets of weighting parameters are used to process different segments of output from the encoder.

In some implementations, receiving the audio data, generating the sequence of feature vectors, processing the sequence of feature vectors, obtaining the sequence of output vectors, determining the transcription, and providing the data are performed by a mobile computing device.

In some implementations, the mobile computing device is a cellular phone.

In some implementations, the encoder, the attention module, and the decoder are all part of a neural network model.

In some implementations, the decoder is configured to generate each output vector based on (i) a context vector from the attention module for a current time step and (ii) data indicating an output label prediction determined for a time step immediately before the current time step.

In some implementations, the output label prediction is an output of a beam search process.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
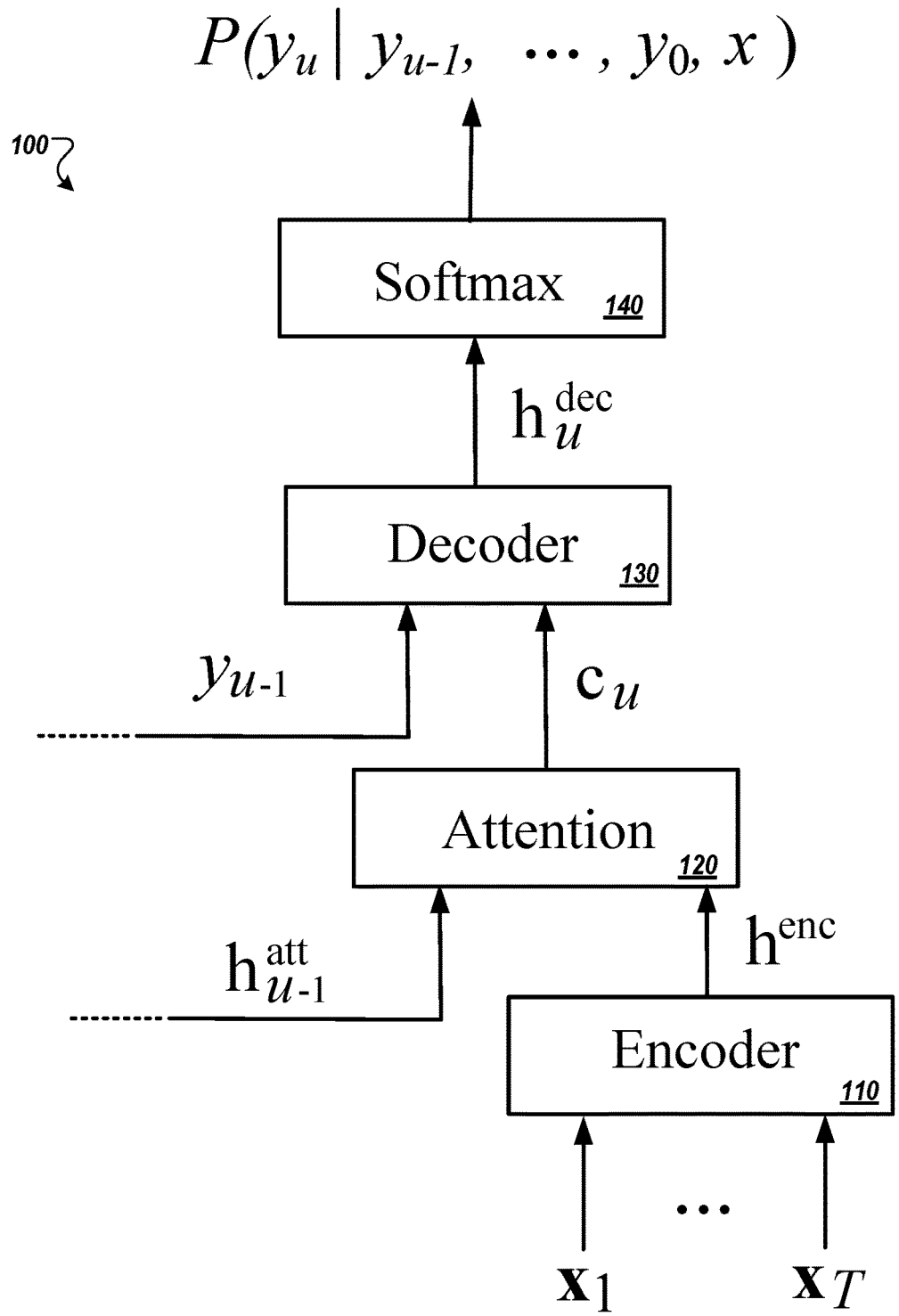
FIG. 1 is a diagram of an attention-based model defining a probability distribution over the next label, conditioned on the history of previous predictions.

FIG. 1 is a diagram of an attention-based model 100. The techniques for defining and training the model 100 are described below.

A set of speech utterances is parameterized into feature vectors as: $x=(x_1; x_2; \ldots ; x_T)$, where $x_i \in R^d$, and the corresponding ground-truth label sequence as: $y^*=(y^*_0; y^*_1; y^*_2; \ldots ; y^*_{L+1})$, where $y^*_i \in G$ (graphemes, in this work). It is assumed that the set of labels, G, contains two special labels, <sos> and <eos>, which denote the start and the end of the sentence, respectively, such that $y^*_0$=<sos> and $y^*_{L+1}$=<eos>.

The attention-based model includes three components: an encoder network 110 which maps input acoustic vectors into a higher-level representation, an attention model 120 which summarizes the output of the encoder based on the current state of the decoder, and a decoder network 130 which models an output distribution over the next target conditioned on the sequence of previous predictions: $P(y_u|y^*_{u-1}; y^*_{u-2} \ldots ; y^*_0; x)$. The model 100, which defines a probability distribution in this manner, is depicted in FIG. 1. As shown in FIG. 1 the output of the decoder network 130 can be processed by a softmax layer 140 to obtain the probability distribution.

The encoder network 110 includes a deep recurrent neural network which receives as input the sequence of acoustic feature vectors, x, and computes a sequence of encoded features, $h^{enc}=(h_1^{enc}; \ldots ; h_T^{enc})$, and is analogous to an acoustic model in a traditional ASR system. The decoder network 130, which is analogous to the pronunciation and language modeling components in a traditional ASR system, includes a deep recurrent neural network, which is augmented with an attention mechanism, e.g., the attention model 120.

The decoder network 130 predicts a single label at each step, conditioned on the history of previous predictions. At each prediction step, the attention model 120 summarizes the encoded features based on the decoder state to compute a context vector, $c_u$. The attention model 120 thus corresponds to the component of a traditional ASR system which learns the alignments between the input acoustics and the output labels. The context vector is input to the decoder network 130 along with the previous label, $y^*_{u-1}$. The final decoder layer produces a set of logits which are input to a softmax layer 140 which computes a distribution over the set of output labels: $P(y_u | y^*_{u-1}; \ldots ; y^*_0 = <sos>)$.

A multi-headed attention model 120 can be used. The attention mechanism used for the attention model 120 can include one or both of two particular features: firstly, the dot-product attention is replaced with additive attention which appears to be more stable; secondly, multiple, independent attention heads are used, allowing the attention model 120 to simultaneously attend to multiple locations in the input utterance, which can improve model performance. The recurrent hidden state of the decoder network 130 after predicting u−1 labels is denoted as $h^{att}_{u-1}$. The attention model 120 employs M independent attention heads, each of which computes attention values, $\beta^i_{t,u} \in \mathbb{R}$, for $1 \leq i \leq M$, $1 \leq t \leq T$:

$$\beta_{t,u}^{i} = u^i \tanh(W^i h_{u-1}^{att} + V^i h_t^{enc}) \quad (1)$$

The individual attention values are then transformed into soft attention weights through a softmax operation, and used to compute a summary of the encoder features, $c^i_u$:

$$\alpha_{t,u}^i = \frac{\exp(\beta_{t,u}^i)}{\sum_{s=1}^T \exp(\beta_{s,u}^i)} \quad c_u^i = \sum_{t=1}^T \alpha_{t,u}^i Z^i h_t^{enc} \quad (2)$$

The matrices $V^i$, $W^i$, and $Z^i$ and the vector, $u^i$, are parameters of the model. Finally, the overall context vector is computed by concatenating together the individual summaries: $c_u = [c_u^1; c_u^2; \ldots ; c_u^M]$.

A training and inference method can be performed. Most attention-based models are trained by optimizing the cross-entropy (CE) loss function, which maximizes the log-likelihood of the training data:

$$\mathcal{L}_{CE} = \sum_{(x,y^*)} \sum_{u=1}^{L+1} -\log P(y_u^* | y_{u-1}^*, \ldots, y_0^* = \langle sos \rangle, x) \quad (3)$$

where, the ground-truth label sequence is used as input during training (i.e., the scheduled sampling is not used). Inference in the model is performed using a beam-search algorithm, where the models predictions are fed back until the model outputs the <eos> symbol which indicates that inference is complete.

Minimum word error rate training of attention-based models is described. An attention-based model can be trained to minimize the expected number of word errors, and thus the word error rate. It is denoted by W(y, y*) the number of word errors in a hypothesis, y, relative to the ground-truth sequence, y*. In order to minimize word error rates on test data, are considered as loss function, the expected number of word errors over the training set:

$$\mathcal{L}_{werr}(x, y^*) = \mathbb{E}[W(y, y^*)] = \sum_y P(y|x) W(y, y^*) \quad (4)$$

Computing the loss in equation (4) is intractable since it involves a summation over all possible label sequences. Two possible approximations are considered, which ensure tractability: approximating the expectation in equation (4) with samples or restricting the summation to an N-best list as is commonly done during sequence training for ASR.

The technique of approximation by sampling is described next. The expectation in equation (4) is approximated by using an empirical average over samples drawn from the model:

$$\mathcal{L}_{werr}(x, y^*) \approx \mathcal{L}_{werr}^{Sample}(x, y^*) = \frac{1}{N} \sum_{y_i \sim P(y|x)} W(y_i, y^*) \quad (5)$$

where, $y_i$ are N samples drawn from the model distribution. Critically, the gradient of the expectation in equation (5) can be itself be expressed as an expectation, which allows it to be approximated using samples:

$$\nabla \mathcal{L}_{werr}^{Sample}(x, y^*) = \sum_y P(y|x)[W(y, y^*) - \mathbb{E}[W(y, y^*)]] \nabla \log P(y|x) \quad (6)$$

$$\approx \frac{1}{N} \sum_{y_i \sim P(y|x)} [W(y_i, y^*) - \hat{W}] \nabla \log P(y|x)$$

where, $\mathbb{E}[\nabla \log P(y|x)] = 0$ and $$\hat{W} = \frac{1}{N} \sum_{i=1}^N W(y_i, y^*)$$

is the average number of word errors over the samples. Subtracting $\hat{W}$ serves to reduce the variance of the gradient estimates and can stabilize training.

Approximation using N-best lists is described. One of the potential disadvantages of the sampling-based approach is that a large number of samples might be required in order to approximate the expectation well. However, since the probability mass is likely to be concentrated on the top-N hypotheses, it is reasonable to approximate the loss function by restricting the sum over just the top N hypotheses. It is noted that this is typically done in traditional discriminative sequence training approaches as well, where the summation is restricted to paths in a lattice.

Denote by Beam(x, N)={$y_1, \ldots, y_N$}, the set of N-best hypotheses computed using beam-search decoding for the input utterance x, with a beam-size, N. The loss function in equation (4) can be approximated by assuming that the probability mass is concentrated on just the N-best hypotheses, as follows:

$$\mathcal{L}_{werr}^{N-best}(x, y^*) = \sum_{y_i \in Beam(x,N)} \hat{P}(y_i|x)[W(y_i, y^*) - \hat{W}]$$

where $$\hat{P}(y_i \mid x) = \frac{P(y_i \mid x)}{\sum_{y_i \in Beam(x,N)} P(y_i \mid x)}$$

represents the distribution re-normalized over just the N-best hypotheses, and $\widehat{W}$ is the average number of word errors over the N-best hypotheses, which is applied as a form of variance reduction, since it does not affect the gradient.

Initialization and training are now described. Based on the two schemes for approximating the expected word error rate, two possible loss functions can be defined:

$$\mathcal{L}^{Sample} = \sum_{(x,y^*)} \mathcal{L}_{werr}^{Sample}(x, y^*) + \lambda \mathcal{L}_{CE} \qquad (7)$$

$$\mathcal{L}^{N-best} = \sum_{(x,y^*)} \mathcal{L}_{werr}^{N-best}(x, y^*) + \lambda \mathcal{L}_{CE} \qquad (8)$$

In both cases, the CE loss function is interpolated using a hyperparameter λ, which can stabilize training. It is noted that interpolation with the CE loss function is similar to the f-smoothing approach in ASR. Training the model directly to optimize $L_{Sample}$ or $L_{N-best}$ with random initialization is hard, since the model is not directly provided with the ground-truth label sequence. The model is initialized with the parameters obtained after CE training.

An experimental setup is described. The proposed approach is evaluated by conducting experiments on a mobile voice-search task. The training set consists of ~15 M hand-transcribed anonymized utterances extracted from Google voice-search traffic (~12,500 hours). In order to improve robustness to noise, multi-style training data (MTR) are constructed by artificially distorting training utterances with reverberation and noise drawn from environmental recordings of daily events and from YouTube using a room simulator, where the overall SNR ranges from 0-30 dB with an average SNR of 12 dB. Model hyperparameters are tuned on a development set of ~12.9 K utterances (~63 K words) and results are reported on a set of ~14.8 K utterances (~71.6 K words).

The acoustic input is parameterized into 80-dimensional log-Mel filterbank features extracted over the 16 kHz frequency range, computed with a 25 ms window and a 10 ms frame shift. Following, three consecutive frames are stacked together, and every third stacked frame is presented as input to the encoder network 110. In some implementations, the same frontend is used for all described models.

Two attention-based models can be trained, differing only in the structure of the encoder network 110: the first model (Uni-LAS) uses 5 layers of 1,400 uni-directional LSTM cells, whereas the second model (Bidi-LAS) uses 5 layers of 1,024 bidirectional LSTM cells (i.e., 1,024 cells in the forward and backward directions, for each layer). The decoder network of both models consists of two layers of 1,024 LSTM cells in each layer. Both models use multi-headed attention with M=4 attention heads. Models are trained to output a probability distribution over grapheme symbols: 26 lower case alphabets a-z, the numerals 0-9, punctuation symbols, etc., and the special symbols <sos>, <eos>. In some implementations, all models are trained using the Tensorflow toolkit, with asynchronous stochastic gradient descent (ASGD) using the Adam optimizer.

The results are described. The impact of various hyperparameters, and the choice of approximation scheme by conducting detailed experiments on the uni-directional LAS model are described. The comparison of loss functions: $L^{Sample}$ and $L^{N-best}$ is described. The first set of experiments evaluate the effectiveness of approximating the expected number of word errors using samples (i.e., optimizing $L^{Sample}$) versus the approximation using N-best lists (i.e., optimizing $L^{N-best}$). The observations are illustrated in FIGS. 2A-2C, where various metrics are plotted on a held-out portion of the training data.

Figure 2A:
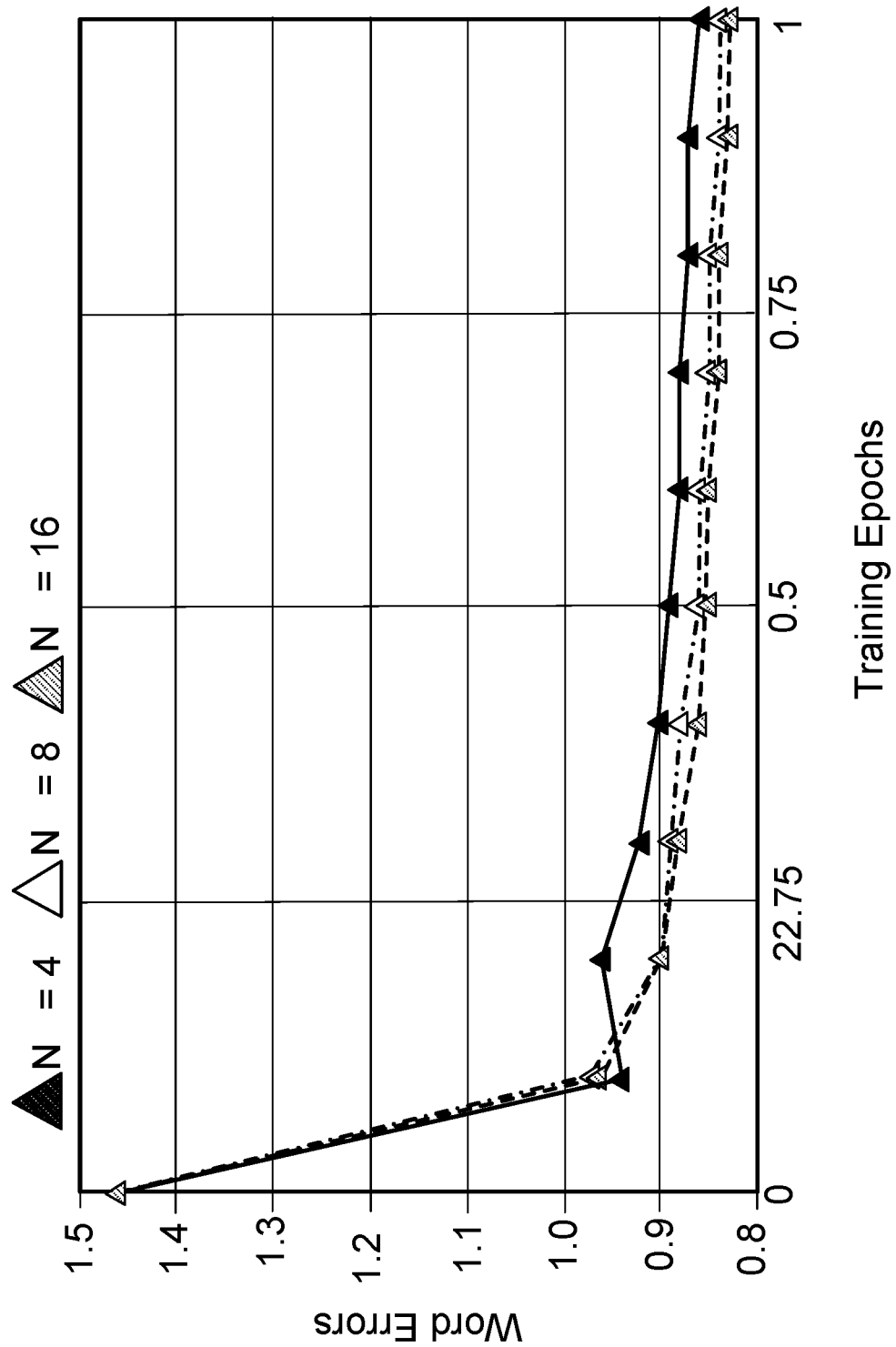
FIGS. 2A-2C illustrate metrics computed on held-out portion of the training set when optimizing loss functions $L^{Sample}$ and $L^{N-best}$.
Figure 2B:
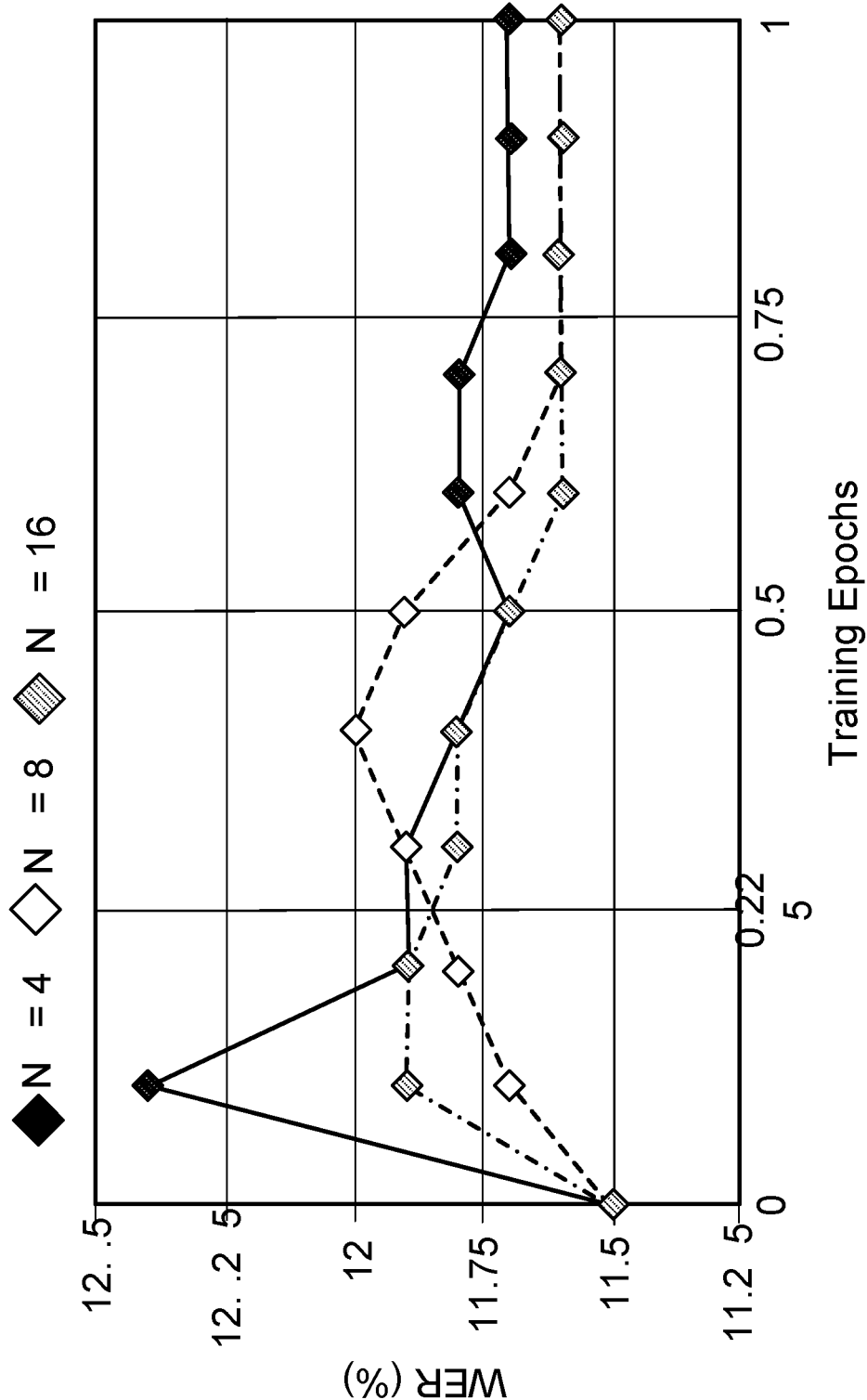

As can be seen in FIG. 2A, optimizing the sample-based approximation, $L^{Sample}$, reduces the expected number of word errors by 50% after training, with performance appearing to improve as the number of samples, N, used in the approximation increases. As can be seen in FIG. 2B, the WER for the top-hypothesis computed using beam search does not improve, but instead degrades as a result of training. It is hypothesized that this is a result of the mis-match between the beam-search decoding procedure, which focuses on the head of the distribution during each next label prediction, and the sampling procedure which also considers lower-probability paths.

Figure 2C:
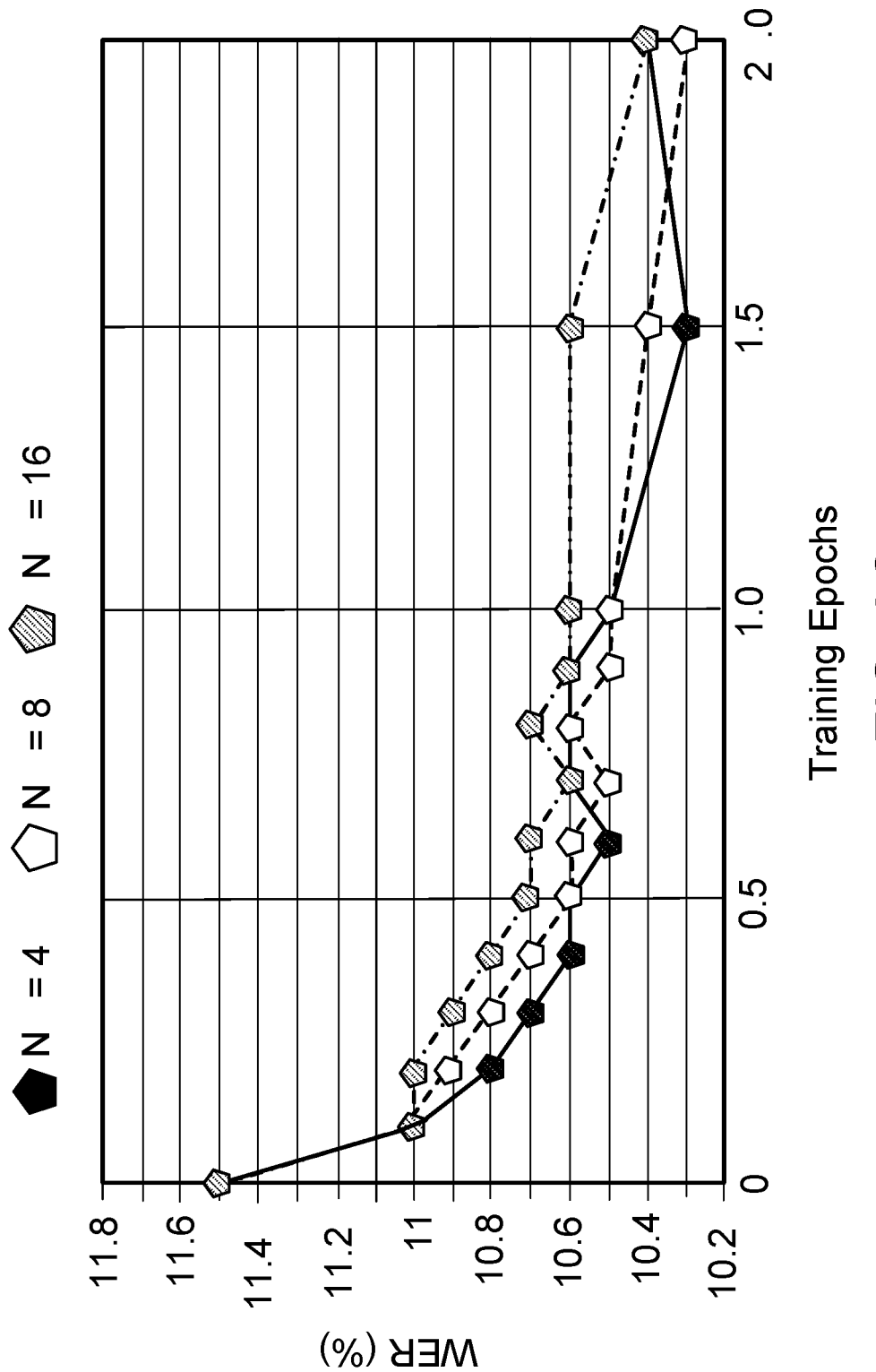

As illustrated in FIG. 2C, optimizing $L^{N-best}$ (i.e., using the N-best list-based approximation) significantly improves WER by about 10.4% on the held-out portion of the training set. The performance seems to be similar even when just the top four hypotheses are considered during the optimization.

Figure 3:
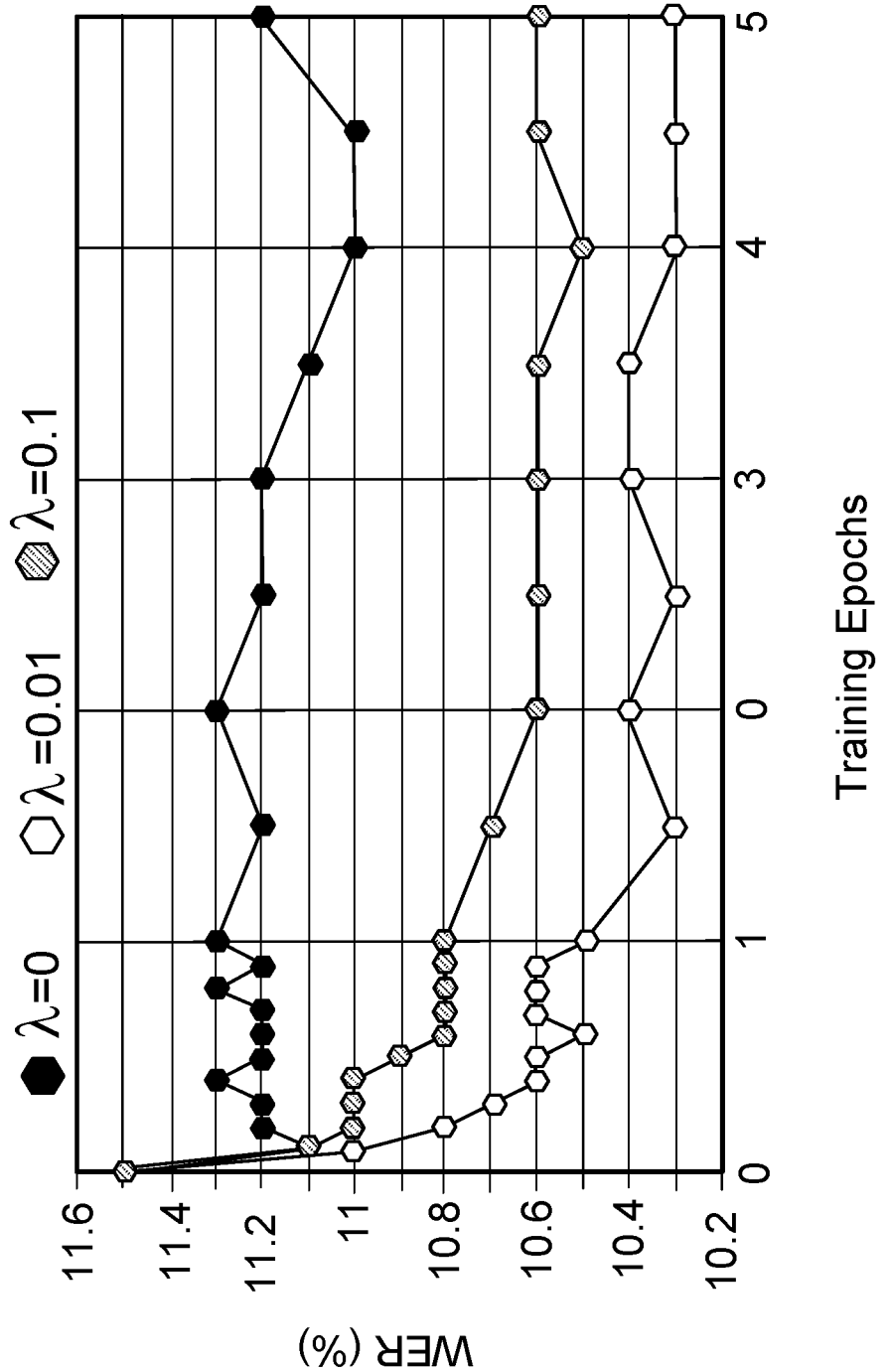
FIG. 3 illustrates word error rates on held-out portion of training set when optimizing $L^{N-best}$, as a function of the CE-loss interpolation weight, when using N=4 hypotheses in the N-best list.

In some implementations, CE loss function can be interpolated during optimization (i.e., setting λ>0). This is illustrated for the case where $L^{N-best}$ is optimized using N=4 hypotheses in the N-best list, as illustrated in FIG. 3.

The improvements from minimum WER training for LAS models are described. The results correspond to expected minimum WER training (MWER) of the uni- and bi-directional LAS models, where N=4 and =0:01. The models were decoded to produce grapheme sequences using a beam-search decoding with 8 beams (column 2) as well as after rescoring the 8-best list using a very large 5-gram language model (column 3). For comparison, results using a traditional state-of-the-art low frame rate (LFR) CD-phone based system are reported. The LFR CD-phone based system uses an acoustic model composed of four layers of 1,024 uni-directional LSTM cells, followed by one layer of 768 uni-directional cells. The model is first trained to optimize the CE loss function, followed by discriminative sequence training to optimize the state-level minimum Bayes risk (sMBR) criterion. The model is decoded using a pruned, first-pass, 5-gram language model, which uses a vocabulary of millions of words, as well as an expert-curated pronunciation dictionary. The results are reported both before and after second-pass lattice rescoring.

As can be seen in Table 1, when decoded without second pass rescoring (i.e., end-to-end training), MWER training improves performance of the uni- and bi-directional LAS systems by 7.4% and 4.2% respectively. The gains after MWER training are even larger after second-pass rescoring, improving the baseline uni- and bi-directional LAS systems by 8.2% and 6.1%, respectively. After MWER training, the grapheme-based uni-directional LAS system matches the performance of a state-of the-art traditional CD-phoneme-based ASR system.

TABLE 1

WERs on the test set after minimum WER training for uni- and bi-directional LAS models. The proposed procedure improves WER by up to 8.2% relative to the CE-trained baseline system.

| System | WER (%) | Rescored WER (%) |
|---|---|---|
| Bi-LAS + | 7.2 | 6.6 |
| MWER ($\mathcal{L}^{N\text{-}best}$) | 6.9 | 6.2 |
| Uni-LAS + | 8.1 | 7.3 |
| MWER ($\mathcal{L}^{N\text{-}best}$) | 7.5 | 6.7 |
| CD-phone (CE + sMBR) | 7.5 | 6.7 |

A technique for training sequence-to-sequence systems to optimize the expected test error rate, which was applied to attention-based systems was described. Sampling-based approximations are not as effective as approximations based on using N-best decoded hypotheses. The proposed approach allows relative improvement of WER by up to 8.2%. The proposed techniques allow training with grapheme-based sequence-to-sequence models, which match performance with a traditional CD-phone-based state-of-the-art system on a voice-search task, which adds further evidence to the effectiveness of sequence-to-sequence modeling approaches.

Figure 4:
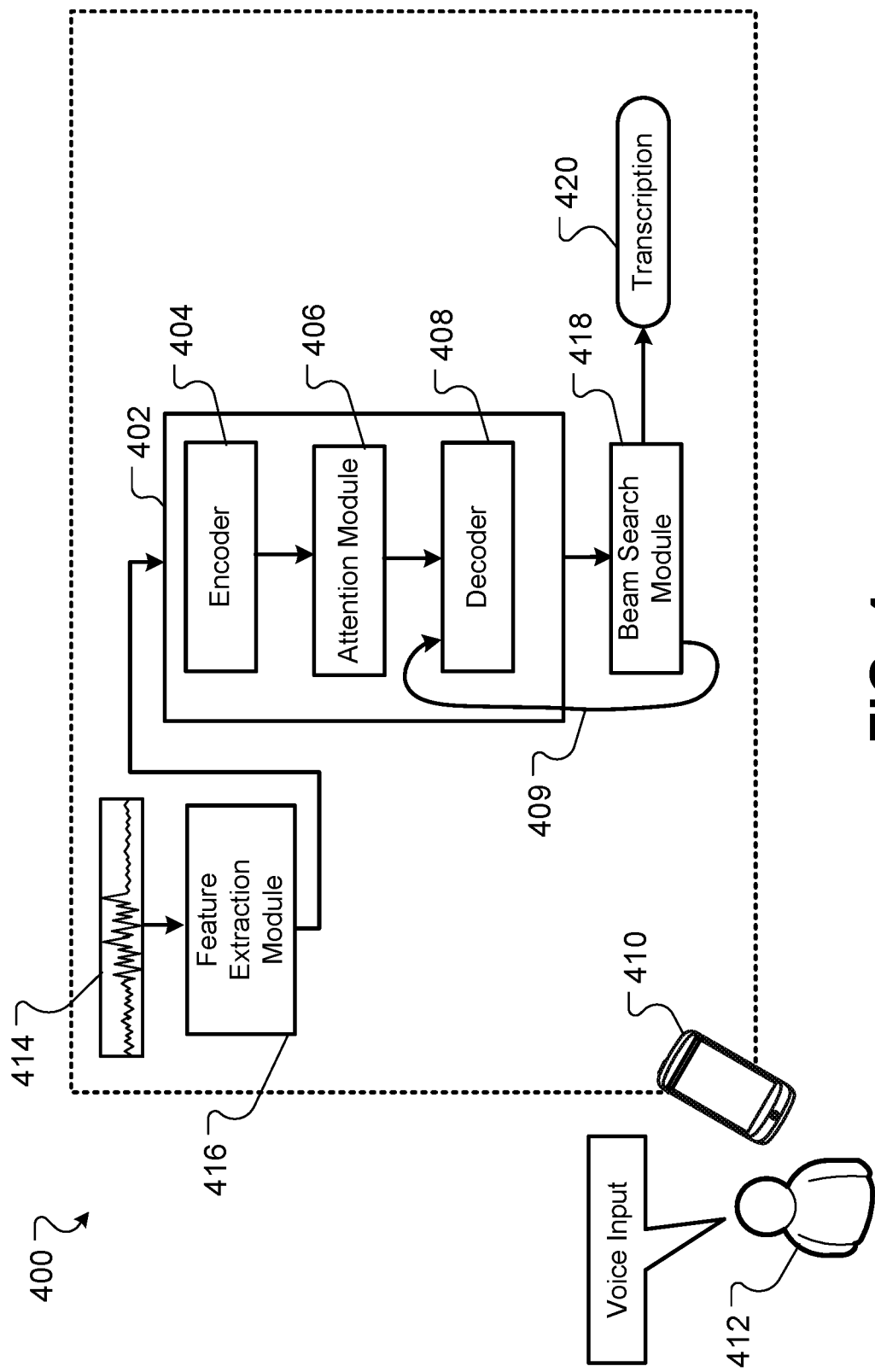
FIG. 4 is a block diagram that illustrates an example of a system for performing speech recognition using a speech recognition model trained using the techniques herein.

FIG. 4 illustrates an example of a system 400 for performing speech recognition using a speech recognition model 402 trained using the techniques discussed above. For example, the speech recognition model 402 can be one that has been trained using sampling or using N-best lists of decoded hypotheses as discussed above. For example, the loss function for training can one that has been trained to minimize word error rate. In the example of FIG. 4, an electronic device 410 stores and uses the speech recognition model 402 to generate a transcription for a voice input. The speech recognition model 402 includes an attention mechanism, represented by attention module 406, that can be a multi-headed attention module.

The electronic device 410 can be any appropriate computing device, for example, a mobile phone, a laptop computer, a desktop computer, a navigation device, a wearable device, a home automation device, an appliance, a smart speaker, a digital conversational assistant device, an entertainment device, etc.

As shown at FIG. 4, the electronic device 410 includes a microphone that detects an utterance from a user 411 and generates audio data 414 representing the utterance spoken by user 412. A feature extraction module 416 processes the audio data 414 to extract (e.g., generate) a set of feature values that are indicative of acoustic characteristics of the utterance. For example, the feature values may be mel-frequency cepstral coefficients. Sets of extracted feature values, e.g., a sequence of feature vectors, are then provided as input to the speech recognition model 402. Each set of feature values (e.g., feature vector) can represent acoustic properties of a different portion of the utterance.

The speech recognition model 402 can be an end-to-end model, for example, a model that includes functions of an acoustic model, language model, and pronunciation model. The speech recognition model 402 may thus be configured to receive acoustic information, e.g., as waveform samples or extracted features, and provide output indicative of likelihoods of language units, e.g., phonetic units (e.g., phones, context-dependent phones, etc.) or orthographic units (e.g., graphemes, word pieces that may include multiple graphemes, and/or whole words).

The speech recognition model 402 can be implemented as one or more neural networks, which can be jointly trained. In some implementations, the one or more neural networks can be trained together as a single model or single neural network. In some implementations, the speech recognition model 402 includes an encoder 404, an attention module 406, and a decoder 408. The speech recognition model 402 can include a softmax layer, which may be integrated with the decoder 408 or may be a separate layer that receives output from the decoder 408. Each of the encoder 404, the attention module 406, and the decoder 408, as well as a softmax layer, may be implemented using one or more neural network layers. These layers can have neural network weights and/or other parameters learned through a training process, such as backpropagation of errors using a variety of training examples. In some implementations, the encoder 404, the attention module 406, and/or the decoder 408 is implemented using one or more recurrent neural network layers, such as long short-term memory (LSTM) layers. The speech recognition model 402 can be implemented as a listen, attend, and spell (LAS) model or as another type of model.

During the speech recognition process, the extracted feature values are provided as inputs to the encoder 404 of the speech recognition model 402. The encoder 404 generates an encoded feature representation as an output. This encoder output is often referred to as an encoding or encoder state, and can be represented by the symbol $h^{enc}$ or $h_u$. The encoder 404 may generate an encoding for each input feature vector provided as input to the encoder 404. The encoder module 404 can perform a function similar to an acoustic model, by receiving input features and mapping them to a higher-level feature representation, $h^{enc}$. This process of generating an encoded feature representation, $h^{enc}$, can be done for each of multiple input frames, representing different input time steps. These time steps are denoted with subscript u below. For example, the inputs can be provided over a set of input steps {0, 1, 2, 3, . . . u}, each corresponding to an input feature vector {$v_0$, $v_1$, $V_2$, $V_3$, . . . $v_u$}, which results in a corresponding set of encoding outputs {$h_0$, $h_1$, $h_2$, $h_3$, . . . $h_u$}.

The output of the encoder 404 is processed using the attention module 406 to generate one or more context vectors $c_i$ for each output time step i. In general, the attention module 406 determines which features in the encodings from the encoder 404 should be attended to in order to predict the next output symbol. The output symbol, or an output distribution representing likelihoods of the output symbol can be represented by output $y_i$, discussed above. The attention module 406 can generate a context output $c_i$ for each of multiple output steps i, where each output step represents a different prediction of the speech recognition model 402. For example, each output step i can represent the prediction of a different output element of an utterance being recognized, where the output elements are graphemes (e.g., characters), wordpieces, and/or whole words. For each context output vector $c_i$, the attention module 406 can compute attention based on the encodings for one or more input steps u, e.g., the encoding for the current input step as well as encodings for previous input steps. For example, the attention module 406 can generate an attention context output $c_i$ over the set of all the encoder outputs of the utterance, e.g., the entire set {$h_0$, $h_1$, $h_2$, $h_3$, . . . $h_u$}. The attention context vector $c_i$ can be a vector representing a weighted summary of the current and previous encodings for frames (e.g., portions) of the utterance being recognized. The input time steps u and the output time steps i can be different, for example, so that there are multiple input time steps for each output time step, but this is not required.

The decoder 408 receives the context vector $c_i$ as an input and uses it to generate an output representation, such as a distribution indicating of likelihoods of word elements.

The decoder 408 can also receive and process, along with the context vector $c_i$, one or more other inputs, such as one or more values indicative of the most recent prediction of the model. This value can an indication of a predicted output label determined by the beam search module 418. This input is represented by the feedback arrow 409. The output label selected by the beam search module 418 is not the only type of value that can be used to indicate a prior prediction of the model. For example, the decoder 408 may be designed and trained to receive a vector indicating multiple outputs, such as an N-best list from the beam search module 418 may be used. As another example, the decoder 408 may be designed and trained to receive an output of the decoder 408 for the immediately previous output time step (e.g., time step i-1) and/or an output of a softmax layer for the immediately previous output time step. For example, the decoder 408 can process inputs including context vector $c_i$ as well as output $y_{i-1}$ to generate decoder output used to create output $y_i$. The output distribution $y_i$ is a function of the decoder state $s_i$ and context vector $c_i$. The decoder state $s_i$ is a function of the previous decoder state, $s_{i-1}$, the previously emitted character, as indicated by the previous output distribution $y_{i-1}$, and the previous context vector $c_{i-1}$.

As an example, the decoder 408 can receive the attention context vector $c_i$ output by the attention module 406, as well as an embedding for the previous prediction, $y_{i-1}$, and process these in order to produce a decoder output. Although not illustrated, the model 400 may include a softmax layer that receives output of the decoder 408. In some implementations, the softmax layer is integrated with the decoder 408, so that the output $y_i$ represents both the output of the softmax layer and the decoder 408. In other implementations, the output $y_i$ represents the output of the softmax layer that is separate from the decoder 408.

The output $y_i$ can be a probability distribution, $P(y_i|y_{i-1}, \ldots, y_0, x)$, over the current sub-word unit, $y_i$, given the previous probability distributions, $\{y_{i-1}, \ldots, y_0\}$, and input feature vectors x. In some implementations, rather than use full probability distributions, information indicating specific selections of output labels can be used. The scores in output $y_i$ indicate likelihoods for each element in a set of output labels representing different word elements. For example, the decoder can provide a probability distribution that indicates posterior probabilities for each of a set of output labels.

The decoder 408 and/or an associated softmax layer may trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the decoder 408 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthgraphic elements (e.g., graphemes, wordpieces, and/or words) in a beam search process for determining the transcription. Of course, numerous variations can be made. For example, the outputs $y_i, y_{i-1}, \ldots y_0$ may each represent a selection of a specific output label rather than a distribution over all possible output labels.

Generating the transcription output for the utterance can include using beam search processing to generate one or more candidate transcriptions based on the output label scores representing probabilities of occurrence for different word elements. The system 400 also includes a beam search module 418 that performs beam search decoding to generate the candidate transcriptions from which a final transcription 420 is generated as an output of the ASR system 400.

In response to generating the transcription 420 using the speech recognition model 402, the electronic device 410 can perform any of various actions. For example, the electronic device 410 can analyze the transcription 420 to detect a hotword (e.g., wake word) or command in the utterance received from user 412. In some implementations, the electronic device 410 determines whether one or more predetermined commands are present in the transcription 420, and when the command is identified the electronic device performs an action corresponding to the identified command. For example, the system 400 can identify and execute a particular command (e.g., activate a virtual assistant, play a song, set a timer, add an item to a list, and so on), change an operating mode of the electronic device 410, send the transcription 420 as a request or query to a server, provide search results generated using the transcription 420 as a query, display the transcription 420 of the utterance, or enter the transcription 420 into a text area of a user interface (e.g., during a dictation mode).

Referring again to the function of the attention module 406, in some implementations, at each time step i the attention module 406 generates a context vector, $c_i$, encapsulating the information in the acoustic signal needed to generate the next character. The attention model is content-based, so the contents of the decoder state $s_i$ are matched to the contents of $h_u$ representing time step u of encoding h, to generate an attention vector $\alpha_i$. Then vector $\alpha_i$ is used to linearly blend vectors $h_u$ to create context vector $c_i$.

As an example, at each decoder timestep i, the attention mechanism can compute the scalar energy $e_{i,u}$ for each time step u, using vector $h_u \in h$ and si. The scalar energy $e_{i,u}$ is converted into a probability distribution over time steps (or attention) $\alpha_i$ using a softmax function. This is used to create the context vector $c_i$ by linearly blending the listener features or encoder outputs, $h_u$, at different time steps, for example, using the equations shown below.

$$e_{i,u} = \langle \phi(s_i), \psi(h_u) \rangle$$
$$\alpha_{i,u} = \frac{\exp(e_{i,u})}{\sum_u \exp(e_{i,u})}$$
$$c_i = \sum_u \alpha_{i,u} h_u$$

As discussed above, the attention mechanism can have multiple heads, and thus there can be multiple context vectors or a context vector having components from different attention heads.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method executed on data processing hardware that causes the data processing hardware to perform operations comprising:
    receiving a sequence of feature vectors indicative of acoustic characteristics of a training utterance;
    receiving a ground-truth label sequence corresponding to the training utterance; and
    training a speech recognition model to minimize word error rate by performing operations comprising:
        processing, using the speech recognition model, the sequence of feature vectors to obtain a set of speech recognition hypothesis samples for the training utterance in a beam search;
        for each speech recognition hypothesis sample in the set of speech recognition hypothesis samples, identifying a respective number of word errors relative to the ground-truth label sequence corresponding to the training utterance; and
        approximating a loss function based on a combination of the respective numbers of word errors identified for each speech recognition hypothesis sample in the set of speech recognition hypothesis samples.

2. The computer-implemented method of claim 1, wherein processing the sequence of feature vectors to obtain the set of speech recognition hypothesis samples comprises:
    determining, based on the sequence of feature vectors received as input to the speech recognition model, a plurality of speech recognition hypotheses for the training utterance;
    ranking the plurality of speech recognition hypotheses; and
    identifying an N-best list of speech recognition hypotheses as the set of speech recognition hypothesis samples for the training utterance.

3. The computer-implemented method of claim 2, wherein determining the plurality of speech recognition hypotheses comprises using the a-beam search to determine the plurality of speech recognition hypotheses.

4. The computer-implemented method of claim 3, wherein the speech recognition model is trained using a same predetermined beam size and a same predetermined value of N.

5. The computer-implemented method of claim 1, wherein N is an integer of a predetermined value.

6. The computer-implemented method of claim 1, wherein the speech recognition model comprises a sequence-to-sequence speech recognition model comprising an encoder and a decoder, wherein the encoder and the decoder each comprise one or more recurrent neural network layers.

7. The computer-implemented method of claim 6, wherein the one or more recurrent neural network layers comprise long short-term memory cells.

8. The computer-implemented method of claim 1, wherein performing the operations for training the speech recognition model to minimize word error rate further comprises reducing variance by adjusting for an average number of word errors over the set of speech recognition hypothesis samples for the training utterance.

9. The computer-implemented method of claim 1, wherein after training the speech recognition model, the trained speech recognition model is configured to provide streaming speech recognition results that include substantially real-time transcriptions of a portion of an utterance while a speaker of the utterance continues to speak the utterance.

10. The computer-implemented method of claim 1, wherein performing the operations for training the speech recognition model to minimize word error rate further comprises using the loss function to distribute probability weight over items in the set of speech recognition hypothesis samples for the training utterance.

11. A system comprising:
    data processing hardware; and
    memory hardware in communication with the data processing hardware and storing instructions that, when executed on the data processing hardware, causes the data processing hardware to perform operations comprising:
        receiving a sequence of feature vectors indicative of acoustic characteristics of a training utterance;
        receiving a ground-truth label sequence corresponding to the training utterance; and
        training a speech recognition model to minimize word error rate by performing operations comprising:
            processing, using the speech recognition model, the sequence of feature vectors to obtain a set of speech recognition hypothesis samples for the training utterance in a beam search;
            for each speech recognition hypothesis sample in the set of speech recognition hypothesis samples, identifying a respective number of word errors relative to the ground-truth label sequence corresponding to the training utterance; and
            approximating a loss function based on a combination of the respective numbers of word errors identified for each speech recognition hypothesis sample in the set of speech recognition hypothesis samples.

12. The system of claim 11, wherein processing the sequence of feature vectors to obtain the set of speech recognition hypothesis samples comprises:
    determining, based on the sequence of feature vectors received as input to the speech recognition model, a plurality of speech recognition hypotheses for the training utterance;
    ranking the plurality of speech recognition hypotheses; and
    identifying an N-best list of speech recognition hypotheses as the set of speech recognition hypothesis samples for the training utterance.

13. The system of claim 12, wherein determining the plurality of speech recognition hypotheses comprises using the beam search to determine the plurality of speech recognition hypotheses.

14. The system of claim 13, wherein the speech recognition model is trained using a same predetermined beam size and a same predetermined value of N.

15. The system of claim 11, wherein N is an integer of a predetermined value.

16. The system of claim 11, wherein the speech recognition model comprises a sequence-to-sequence speech recognition model comprising an encoder and a decoder, wherein the encoder and the decoder each comprise one or more recurrent neural network layers.

17. The system of claim 16, wherein the one or more recurrent neural network layers comprise long short-term memory cells.

18. The system of claim 11, wherein performing the operations for training the speech recognition model to minimize word error rate further comprises reducing variance by adjusting for an average number of word errors over the set of speech recognition hypothesis samples for the training utterance.

19. The system of claim 11, wherein after training speech recognition model, the trained speech recognition model is configured to provide streaming speech recognition results that include substantially real-time transcriptions of a portion of an utterance while a speaker of the utterance continues to speak the utterance.

20. The system of claim 11, wherein performing the operations for training the speech recognition model to minimize word error rate further comprises using the loss function to distribute probability weight over items in the set of speech recognition hypothesis samples for the training utterance.

* * * * *